United States Patent

Hamma et al.

Patent Number: 6,166,629
Date of Patent: Dec. 26, 2000

[54] COMBINATION DELAY BOX WITH DRIVER REACTION TIME TESTER AND TACHOMETER AND PLAYBACK

[76] Inventors: Nolen L. Hamma, 2036 Fillmore St.; Dwain C. May, 2508 Jersey Ridge Rd., both of Davenport, Iowa 52803; Saverio Biondo, 5 Clayton Dr., Clarksburg, N.J. 08510

[21] Appl. No.: 09/454,393

[22] Filed: Dec. 3, 1999

[51] Int. Cl.$^7$ .................................................. B60Q 1/00
[52] U.S. Cl. ..................... 340/438; 340/441; 340/456; 340/466; 340/992
[58] Field of Search .................. 340/438, 439, 340/466, 461, 936, 922, 441; 345/172, 168, 169, 334; 307/10.1, 9.1, 10.6; 324/160, 166

[56] References Cited

U.S. PATENT DOCUMENTS

| | | |
|---|---|---|
| Re. 32,474 | 8/1987 | Reid . |
| 4,784,099 | 11/1988 | Noe et al. . |
| 5,361,705 | 11/1994 | Powell ...................................... 104/60 |
| 5,367,298 | 11/1994 | Axthelm ..................................... 341/22 |
| 5,600,185 | 2/1997 | Hamma et al. ......................... 307/10.1 |
| 5,624,712 | 4/1997 | Biondo . |
| 5,642,712 | 7/1997 | Biondo ................................... 123/398 |
| 5,839,419 | 11/1998 | Hawley ................................... 123/398 |
| 5,892,294 | 4/1999 | Reid ....................................... 307/10.1 |
| 5,900,864 | 5/1999 | Macdonald .............................. 345/172 |
| 5,905,374 | 5/1999 | Westberg et al. ........................ 324/160 |
| 5,982,168 | 11/1999 | Westberg et al. ........................ 324/160 |

OTHER PUBLICATIONS

Auto Meter, Inc. "Data Acquisition" website pages; Nov. 1999.

*Primary Examiner*—Jeffery A. Hofsass
*Assistant Examiner*—Hung Nguyen
*Attorney, Agent, or Firm*—John R. Mugno

[57] ABSTRACT

A multi-function, composite apparatus for mounting on a drag racing vehicle is described which includes: (i) a terminal panel having leads coupled to various vehicle control components of the vehicle to affect operation of the vehicle; (ii) a display means to depict a plurality of different racing indicia selectable by a user wherein at least one of said indicia relates to vehicle performance during racing such as delay box timers, throttle stop controllers, cross over delay timers, etc. and a second indicia relating to a non-racing function such as driver reaction time tester or race playback function; and (iii) a keypad having a plurality of user-operable keys including function keys to control what indicia is shown on the display means and data input keys to modify the data in the apparatus. All required outputs can be shown on a single visual display means.

11 Claims, 9 Drawing Sheets

COMBINATION DELAY BOX WITH DRIVER REACTION TIME TESTER AND TACHOMETER AND PLAYBACK

FIELD OF THE INVENTION

This invention is generally directed to an apparatus for improving the functioning of a drag racing vehicle and the skills of the driver operating said vehicle. More specifically, a single "black box" apparatus is provided which performs delay box functions, throttle stop controller functions, a driver reaction time tester, and a race recording and playback feature. A single, inexpensive display means on the black box and on-board the vehicle provides meaningful data for each function/feature as selected by the driver.

BACKGROUND OF THE INVENTION

In the popular sport of drag racing, the main objective is to complete the race (usually conducted along a straight quarter of one mile track) as quickly as possible. The race begins after a series of lights are flashed on a starting line "Christmas tree", culminating in a green light. Some important factors in successful drag racing are prompt acceleration of the vehicle, speed of the vehicle, the reaction time of the driver to the series of lights, the functioning of the vehicle, the proper analyses of race results, etc.

In order to maintain competitive races whereby simply the most expensive vehicle does not prevail in each race, many tracks establish a pre-set minimum time in which a race may be completed. This pre-set time is typically referred to as an index time and is established to ensure close results between competitors. If a car completes the race in a time under the allotted index time, the racer is declared the loser by disqualification.

Whether in "open" racing or "index" racing, many technical advancements have been made to improve upon the aforementioned factors which affect the outcome of a race. At the same time, most sanctioning bodies attempt to maintain driver skill as the most critical factor to the race result.

One example of the technology typically employed to improve drag racing is Reid Reissue U.S. Pat. No. 32,474 ("the '474 patent") entitled VARIABLE TIME DELAY APPARATUS FOR CONTROLLING THE START OF A VEHICLE. The device described in the '474 patent is a delay circuit which is commonly incorporated into a delay box. In essence, the driver ideally attempts to have the race vehicle leave the starting line at exactly the time when the green light on the Christmas tree turns on. To accomplish this goal, however, the driver must anticipate the green light and actually release the transbrake solenoid before the green light illuminates (usually when an amber warning light appears). This "anticipation" of the green light is necessary since both the driver has a reaction time and the vehicle also has a reaction time before the car actually begins to move. Most presently available drag racing vehicles have the ability to take off so fast that if the driver releases the brake solenoid on the last amber warning light, the car will still undesirably take off before the green light, thereby resulting in a false (or foul) start. The circuitry presented in the '474 patent is coupled to the braking means and provides a variable time delay until the brake is actually released. Thus, the occurrence of foul starts is greatly reduced. The operation of such delay circuits is well understood in the art.

The actual setting of the delay times for the circuitry established in devices such as shown in the '474 patent is particularly important in a very popular form of drag racing known as "elapsed time" or "ET" racing wherein the more powerful car is held at the starting line for a longer period of time. Again, the goal in such racing is to maintain competitiveness and emphasize driver skill. Although in ET racing, a green light appears separately for each driver, it is typically advantageous for the driver of the faster vehicle (which faces a delayed start) to react based on the first series of lights on the Christmas tree. However, in such instances, the delay timers of each racer, while dependant on each other's respective speeds, should be separately set.

Hamma et al. U.S. Pat. No. 5,600,185 ("the '185 patent") entitled CROSS OVER DELAY APPARATUS provides means to permit a driver to react to the first amber light of the Christmas tree regardless of whether the race is handicapped or not. The race crew inputs the opponent's established elapsed time (ET) and their own established elapsed time (ET) into the invention's apparatus, as well as the standard timing-light/reaction-time delay used by the driver. The device then automatically calculates the handicap by which a faster car will be held and adds that time to the timing-light/reaction-time delay. This permits the driver to begin release timing from his opponent's Christmas tree lights, as opposed to his own. The driver may, of course, use his own Christmas tree if desired by setting the ET timers to zero, to equal values, or by setting the opponent's ET lower than his own.

While the aforementioned '474 patent and '185 patent relate to a delay time feature at the initiation of the race, there are also numerous devices which can affect the operation of the race vehicle during the race itself (although many are typically programmed prior to the start of the race). As described in prior art Noe et al. U.S. Pat. No. 4,784,099 ("the '099 patent") entitled TIME OPERATED THROTTLE STOP, drag racing vehicles are typically designed to run faster than the allotted index time if the vehicle is maintained at full throttle. Designing the vehicle with a speed capacity that would allow it to complete a race under the allotted index time ensures that the vehicle will have sufficient power (and speed) under all racing conditions. However, this excess power must be controlled so as to complete the race in a total time in excess of the allotted index time, thereby avoiding disqualification. The '099 patent describes one specific example of what is commonly referred to as a two-stage (or dual stage) throttle stop controller. In essence, the throttle, while wide open at launch to reach maximum acceleration, will be closed for a period of time during the race so that the car does not run at an overall speed quicker than the allotted index time would allow.

Two-stage throttle stop controllers are operated by setting two timers prior to launch. The two timers begin to run upon launch of the vehicle. When the first timer expires, the throttle will be shut. Upon expiration of the second timer, the throttle will again be opened as it was at launch. Obviously, the difference between the values preset in the first and second timers is equivalent to the time in which the throttle will be closed. The result of utilizing such a two-stage throttle stop controller is a vehicle which launches at full throttle, reduces power at mid-track, and then reaches maximum power once again for the end of race ("top-end") charge. In reality, then, the term "two-stage" throttle stop controller is a misnomer since three separate stages (full throttle, close throttle, followed by full throttle) are actually achieved.

More recently, four-stage throttle stop controllers have been incorporated in drag racing vehicles. A four-stage throttle stop controller uses four timers which result in two separate periods during the race (after launch) in which the throttle will be closed. The main purpose of the second period of time during which the throttle is closed (a duration equal to the difference between the third and fourth timers) which is programmed to occur near the finish line, is to confuse your opponent into thinking there is a risk of running under the allotted index time (which would result in a disqualification). Ideally, your opponent would jam on his/her brake to avoid such a disqualification, your fourth timer would expire thus reopening your throttle, thereby permitting you to cruise to victory.

Biondo U.S. Pat. No. 5,642,712 ("the '712 patent") entitled ADJUSTABLE TIME OPERATED THROTTLE BASED ON ACTUAL RACE CONDITIONS provides an improved two-stage and four-stage throttle stop controller which permits the driver to increment or decrement the settings of the throttle stop controller timers based on actual conditions encountered during the race. Thus, if actual track conditions prove slower than anticipated, the value in the second timer is decreased thereby resulting in less time during which the throttle is closed. Alternatively, if the track proves faster than anticipated, the value in the second timer is increased thereby increasing the time in which the throttle is closed. This flexibility permits for more effective racing on race day. The device of the '712 patent can be utilized on two-stage or four-stage throttle stop controllers.

While the prior art described to this point reflects actions which occur when a vehicle is actually on the track, there are certain activities which can improve a driver's results for future races. For instance, there are separate push button devices presently marketed known as practice trees upon which a driver can test his reaction time for the start of a race. The miniature lights simulate the actual large Christmas trees so that a driver can improve his reaction time at the start of a race. However, no matter how much a driver practices, it is still essential to get feedback from races to determine how a vehicle and driver performed in an actual race, as opposed to the expected reactions.

One means of checking the results of the race is to utilize a replay tachometer that can provide information regarding the shifting and operation of the engine of the vehicle. The greatest problem in replay tachometers is that, although they provide information as to whether the engine shifted, there is no time reference as to when each action took place. More recently, separate interface devices have been made available which can be connected to the replay tachometer to download or print out engine functioning data. Although a time reference can be established upon which to plot such information, it is no more than an estimate of the actual operation of a delay box and a throttle stop controller. More importantly, such separate interface devices are expensive, stand-alone products that must be attached separately to the tachometer. The expense and complexity of such devices have prevented their wide spread adoption.

While separate driver reaction time testers and tachometer playback devices exist, it is extremely disadvantageous that such devices require separate components, wirings, etc. These inconveniences also result in additional expense.

In view of the aforementioned and other deficiencies in the prior art, it is therefore a primary object of the present invention to provide a new and improved vehicle control box for a drag racing vehicle that further provides a driver reaction time tester utilizing a single, on-board display means.

It is yet a further object of the present invention to provide a new and improved vehicle control box for a drag racing vehicle that additionally provides a race playback feature utilizing a single, on-board display means.

It is still yet a further object of the present invention to provide a new and improved vehicle control box for a drag racing vehicle that additionally enters the race playback feature mode utilizing the same user-operable keypad used to operate the vehicle control box.

It is therefore a primary object of the present invention to provide a new and improved vehicle control box for a drag racing vehicle that further enters the driver reaction time tester mode utilizing the same user-operable keypad used to operate the vehicle control box.

It is yet another object of the present invention to provide a new and improved vehicle control box for a drag racing vehicle that combines race features, practice features, and playback features utilizing a single, on-board display means to minimize cost.

Other objects and advantages of the present invention will become apparent from the specification and the drawings.

SUMMARY OF THE INVENTION

Briefly stated and in accordance with the preferred embodiment of the invention, a multi-function, composite apparatus for mounting on a drag racing vehicle is described which includes: (i) a terminal panel having leads coupled to various vehicle control components of the vehicle to affect operation of the vehicle; (ii) a display means to depict a plurality of different racing indicia selectable by a user wherein at least one of said indicia relates to vehicle performance during racing such as delay box timers, throttle stop controllers, cross over delay timers, etc. and a second indicia relating to a non-racing function such as driver reaction time tester or race playback function; and (iii) a keypad having a plurality of user-operable keys including function keys to control what indicia is shown on the display means and data input keys to modify the data in the apparatus. All required outputs can be shown on a single visual display means.

BRIEF DESCRIPTION OF THE DRAWINGS

While the specification concludes with claims particularly pointing out and distinctly claiming the subject matter regarded as the invention herein, it is believed that the present invention will be more readily understood upon consideration of the description, taken in conjunction with the accompanying drawings, wherein:

DESCRIPTION OF THE PREFERRED EMBODIMENT

Figure 1:
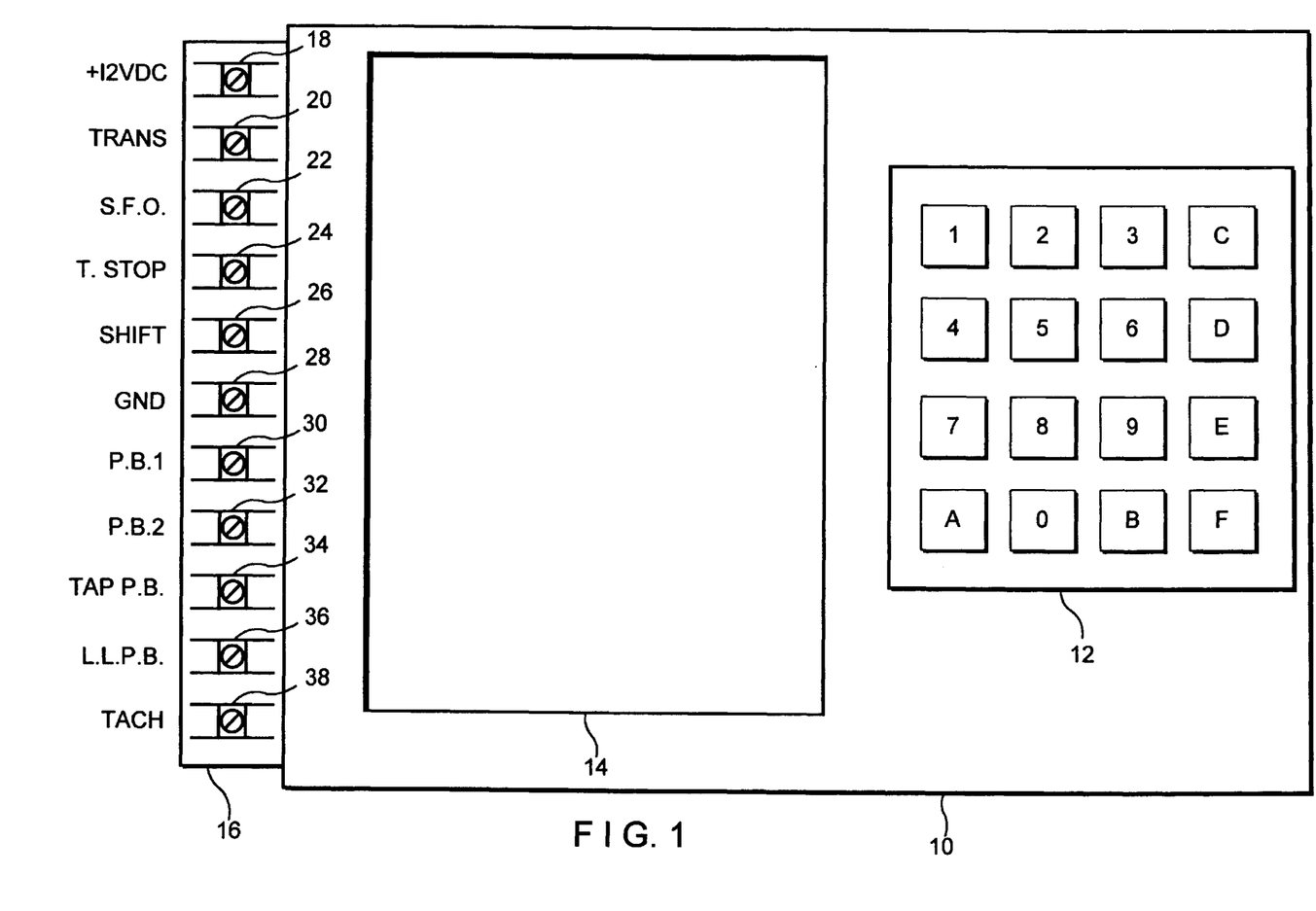
FIG. 1 is a block diagram of the front face of an on-board vehicle control box in accordance with the present invention.

Referring first to FIG. 1, the front of a vehicle control box 10 of the preferred embodiment of the present invention is shown. Vehicle control box 10 includes a keypad 12, a display means 14, and a terminal (or connector) panel 16. In the preferred embodiment, keypad 12 is made up of a plurality of numerical and function keys that are used to control the information that is either entered into the software of vehicle control box 10 or to select what data should be shown on display means 14. The numerical keys 0–9 are used in conjunction with the function keys A and B to enter new information into vehicle control box 10. Alternatively, the numerical keys 1–5 and the function keys C, D, E, and F are used to control what information is shown on display means 14. The utilization of the various keys on keypad 12 will become more apparent as the description herein continues. Display means 14 can be comprised of either a single, custom-made liquid crystal display (LCD) or a combination of several LCD's. Furthermore, alternative visual display means besides that of LCD's could be incorporated. For instance, tri-color LEDs might be utilized.

In the preferred embodiment of the present invention, terminal panel 16 comprises eleven separate "screw-type" connectors. Voltage terminal 18 is connected to a switched +12 volts source that contains sufficient amperage capable of driving all outputs at the same time. Transbrake terminal 18 is connected to a transbrake solenoid. The Selectable Function Output ("S.F.O.") terminal 22 is, in effect, an optional lead which can be utilized by the driver to be connected to function in one of several ways. For example, S.F.O. terminal 22 could be attached to: (i) a device to be used as the starting line enhancer (usually a linkage style throttle stop); (ii) a device to be controlled by the second four-stage timer; (iii) a line lock device, if the line locks are to be engaged when the transbrake is engaged or the line lock push button is pressed; and (iv) the transbrake solenoid, as a temporary back-up output.

Throttle stop terminal 24 on terminal panel 16 is connected to the throttle stop and is operable when the first timer of a throttle stop controller expires. Shift terminal 26 is coupled to a transmission shifter. Ground terminal 28 is typically either coupled to a negative terminal on the engine battery or to another steel ground. "Push Button 1" terminal 30 is coupled to a push button operable by the driver. In so-called single push-button mode, the push button connected to Push Button 1 terminal 30 is used to control the primary delay and the secondary delay in sequence. In so-called dual push-button mode, the push button connected to Push Button 1 terminal 30 is used to control the primary delay only. "Push Button 2" terminal 32 is also coupled to a push button operable by the driver. In so-called single push-button mode, Push Button 2 terminal 32 is disabled and has no effect on the operation of the unit. However, in so-called dual push-button mode, Push Button 2 terminal 32 is connected to a push button which is used to control the secondary delay.

"Tap Push Button" terminal 34 is optionally utilized to connect to an additional push button. In the preferred embodiment, Tap Push Button terminal 34 can control three different operations: (i) if the starting line enhancer is ON and before the transbrake is applied, if the push button connected to Tap Push Button terminal 34 is pressed, the throttle will close allowing the car to be staged at a pre-set RPM; (ii) after a transbrake push button has been released, every time the push button attached to Tap Push Button terminal 34 is depressed, a programmable amount of time is either added to, or subtracted from, the first delay times started when the transbrake is released; and (iii) a quarter of a second after the transbrake releases, and for every time the push button attached to the Tap Push Button terminal 34 is depressed, a programmable amount of time is subtracted from the second or fourth stage timers. In essence, the push button attached to Tap Push Button terminal 34 allows for adjustments to the stages.

Line Lock Push Button terminal 36 is connected to yet an additional push button. In the preferred embodiment of the present invention, the push button attached to Line Lock Push Button terminal 36 functions as follows: (i) if the push button attached to Line Lock Push Button terminal 36 is pressed and the SFO terminal 22 is established as set in (ii) above, any line locks attached to SFO terminal 22 will be engaged; and (ii) if the push button attached to Line Lock Push Button terminal 36 is pressed, the replay tachometer record function will become armed. The final terminal on terminal panel 16 is tachometer terminal 38. Tachometer terminal 38 must be properly attached to an engine tachometer in order for the race playback function of the present invention to operate.

Figure 2A:
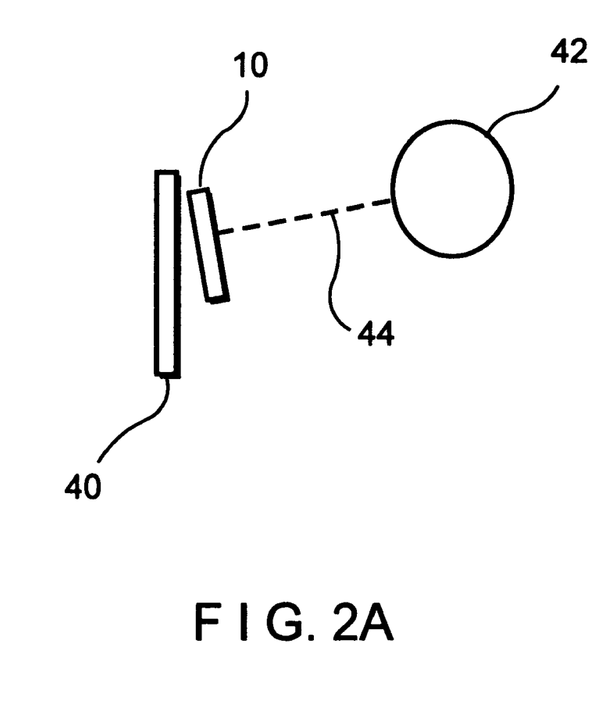
FIG. 2A and FIG. 2B are schematic illustrations reflecting preferred means for mounting the vehicle control box of FIG. 1 in a vehicle.
Figure 2B:
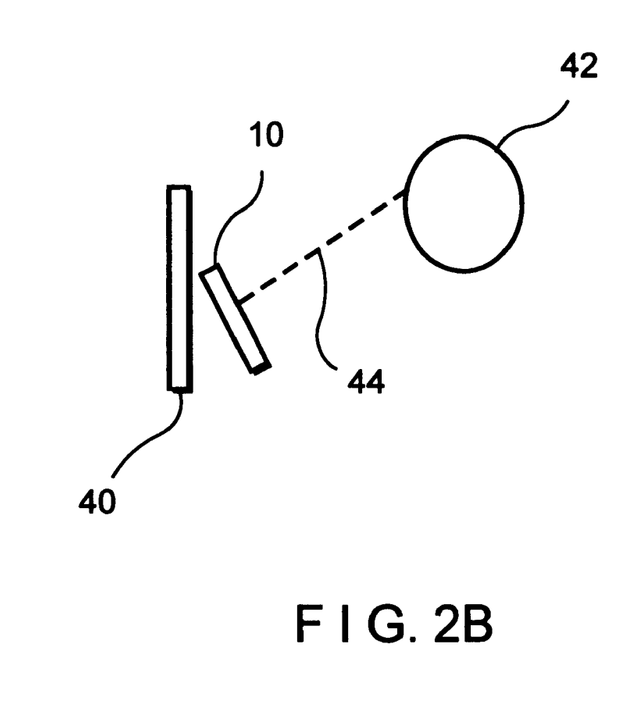

The description of the present invention to this point has illustrated the preferred means for connecting available terminals and engine components. All functions can be displayed on single display means 14 of vehicle control box 10. However, in order for a driver to easily view display means 14, it is essential that vehicle control box 10 be properly mounted. Vehicle control box 10 should be mounted so that display means 14 is easily legible in both day and night conditions. Referring to FIG. 2A, vehicle control box 10 is mounted high on dash 40 so that driver 42 can easily view display means 14 on vehicle control box 10. Dotted indicator lines 44 represent the driver's line of vision. In FIG. 2B, vehicle control box 10 is mounted on a lower portion of dash 40. Thus, the mounting angle of vehicle control box 10 is greater. The mounting angle of FIG. 2B is more effective than the mounting angle of FIG. 2A in high glare environments.

The operation of vehicle control box 10 when properly mounted and electrically connected is completely operable by a driver utilizing keypad 12 and display means 14. In the preferred embodiment of utilizing the numerical and alphabetic keypad 12, function keys A and B are used to enter new values into the software of vehicle control box 10 whereas function keys C, D, E and F are used to control what specific information is shown on display means 14.

The function key C is utilized to set dial-in times and delay times. More specifically, to set a new dial-in time for either yourself or your competitor, the C key should be depressed until an "A" is displayed next to your dial-in time and a "B" is shown next to your competitor's dial-in time as shown on visual display means 14. To enter a new dial-in number, press the corresponding letter key (A or B) for the dial-in time to be changed. The selected display row will go blank indicating the unit is ready to accept the new dial-in time. Enter the new dial-in time using the numerical keys, wherein preferably leading zeros do not have to be entered. For example, if 9.90 seconds for a dialed-in time is desired on a four-digit display, "990" would be entered on the keypad. As numbers are entered they are shown on display means 14, indicating the numbers are accepted and entered into memory. If a mistake is made while entering the number, depressing the corresponding letter key (A or B), again will erase the last digit entered.

The function key C is also utilized to set delay times. More specifically, to set a new delay time into either delay timer 1 or delay timer 2, repeatedly press the C key until the letters A and B are shown next to the delay times. Then, the same procedure for entering a new number as instructed in setting new dial-in times can be implemented.

The D function key is preferably utilized to control four sets of values to be shown on display means 14. One set of values would be the Tap Up/Down information associated with the A key and the "How Late" time associated with the B key. The Tap Up/Down information relates to delay box timer adjustments and the "How Late" information relates to post-race analyses of the start of the race. To change these values, the D key should be depressed until the letters A and B are shown next to the Sub/Add and How Late values, respectively. The Sub/Add information is shown to the right of the letter A on visual display means 14. The left most digit shows the number of times the Tap Up/Down push button was pressed. The two right hand digits show the programmable time (0–9 hundredths of a second) to be subtracted from or added to the delay time every time the Tap up/Down push button is pressed. Above the two right digits the word "Sub" or "Add" will be shown; the appearance of "Add" will add time whereas the appearance of the word "Sub" will subtract time. To change the number, press the A key and enter the new number (0–9). To switch between the Sub and Add modes press the A key repeatedly, once the far right digit is blank the unit will toggle between Sub and Add modes each time the A key is pressed. Once the mode is selected enter the new Sub/Add amount.

While the same screen is shown as the Sub/Add value, the "How Late" value will also be displayed. The How Late information is shown to the right of the letter B on visual display means 14. If the transbrake is released on Delay-2 (4-digit); the left most digit will display a "2"; if not, it will be a "1." The remaining digits display the How Late time. For example, if the number displayed is "2.012" and your reaction time was 0.510, add the How Late time to the 0.510 for a total reaction time of 0.522 on the cross over delay. Typically, the "How Late" values are stored in memory until new values are inserted.

The D key can also be utilized to display the following pairs of numbers on display means 14: (i) the starting line enhancer time and the programmable throttle stop override time; (ii) the throttle stop 1 mode and the throttle stop 2 mode; and (iii) push button mode (whether a single push button will operate both primary and secondary delays or whether push button will be used in sequence) and S.F.O. mode (whether the S.F.O. terminal is to function as a starting line enhancer, a second throttle stop, a line lock control, a second transbrake output, or OFF).

The E function key, like the D function key, also preferably displays four sets of values on display means 14 which can be adjusted by the corresponding A and B key and the numeric keys. The E function key controls the following four sets of values: (i) Stage 1 Throttle 1 and Stage 2 Throttle 1 timer values; (ii) Stage 3 Throttle 1 and Stage 4 Throttle 2 timer values; (iii) Stage 1 Throttle 2 and Stage 2 Throttle 2 timer values; and (iv) Stage 3 Throttle 2 and Stage 4 Throttle 2 timer values. The Throttle 2 timer values are only meaningful when the Selectable Function Output is set to a mode wherein a secondary throttle controller (such as a nitrous oxide device) is incorporated.

As described in the preferred embodiment of the present invention, the F function key is utilized to change two pairs of values which may be indicated on display means 14 of vehicle control box 10 by utilizing the A and B key and the numerical keys. However, the F function key also provides two pairs of numbers on display means 14 which are not modifiable but instead are utilized for driver reaction time testing and race playback. The simulated driver reaction time testing mode and the actual playback of a race on a vehicle control box mounted in a vehicle effectively provides an inexpensive means to achieve more successful racing results.

The first pair of values displayed utilizing the F function key is RPM value and Shift Point value. The RPM value actually displays one of two numbers dependent on whether the engine is ON or OFF. When the engine is ON, the RPM is read from a tachometer. When the engine is OFF, peak RPM value will be the highest RPM the engine had reached since the last time the peak RPM was cleared. To clear the Peak RPM, the F function key should be depressed until the letters A and B are shown next to the RPM value and the Shift Point value, respectively. If the words "Peak RPM" are being shown on the screen, press the A key and the Peak RPM will be set to zero. If the engine is ON when the A key is pressed nothing will happen. The Shift Point value is actually modified concurrently with or following settings of the next pair of values which are the number of cylinders and its determination of whether the vehicle control box is in a TIME or RPM mode.

The present invention permits for five shifts during each pass; however, less or more shifts could be selected. These five shifts can be made based either on TIME, RPM, or a combination of both. The shifts occur when the Shift Point setting is reached for each of the five shifts in sequence. The five Shift Points can all be set to different values and Shift Modes (i.e., TIME or RPM). When looking at the Shift Points, at the bottom of the screen the Shift Mode and Shift Number will be displayed. To look at all the Shift Points, repeatedly press the F key until the letters A and B are shown next to the number of cylinders in the Shift Mode (whether shifts are based on TIME of RPM). To the far right of the letter B is the Shift Number (1–5). To change the Shift Number, press the number on the keypad for the desired Shift Number. For each Shift Number, the Shift Point will be displayed towards the top of the screen and the Shift Mode will be shown at the bottom of the screen by the word "RPM" or "TIME." To change the Shift Mode, repeatedly press the B key. Each time the B key is pressed, the Shift Mode toggles between either RPM or TIME made as shown on display means 14. Only when viewing Shift Number 1 can the Shift Output be seen or changed. The Shift Output is displayed as either "LO" or "HI" along with the Shift Mode and Shift Number. When the Shift Output is set to "HI" (normally open) it means that every time a Shift Point is reached, the shift terminal will go from a LO (0 volts) to a HI (12 volts). When a Shift Output is set to "LO" (normally closed), it means that every time a Shift Point is reached, the shift terminal will go from a HI (12 volts) to a LO (0 volts). Setting the Shift Output is done at the same time the Shift Mode is set for shift number 1.

To set a Shift Point, a user must first make sure the Shift Number is set correctly then repeatedly press the F key until the letters A and B are shown next to RPM (or TACH) and Shift Point values. Upon depression of the B key, the digits to the right of the letter B will go blank. Then, following the same procedure for entering a new number as instructed above, values can be set. Typically values from 0.02 to 99.99 can be entered for TIME mode and from 1000 to 9950 in 50 RPM increments for RPM mode.

Figure 3A:
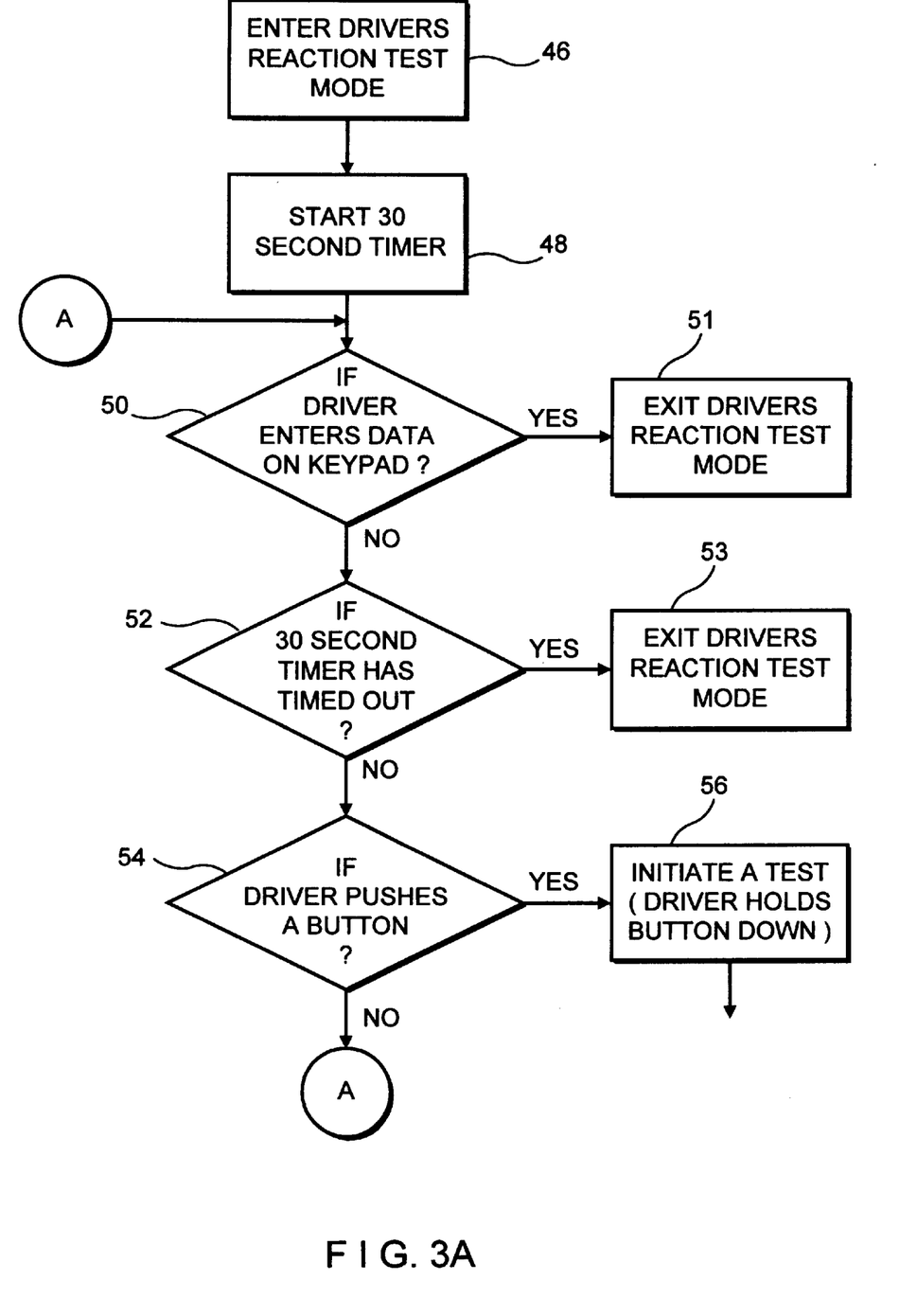
FIG. 3A, FIG. 3B, and FIG. 3C reflect a simplified flow diagram of the driver reaction time tester in accordance with the present invention.
Figure 3B:
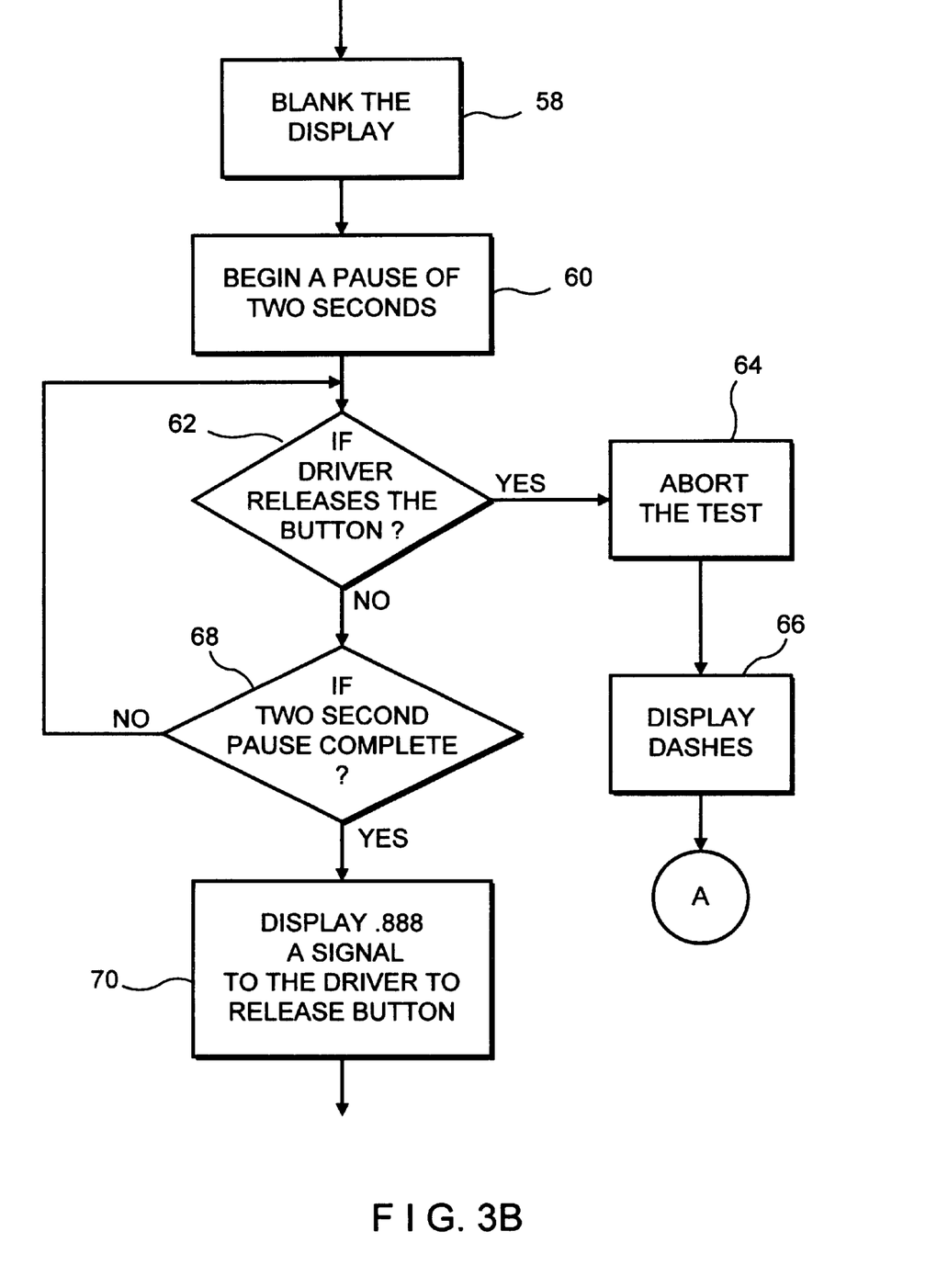
Figure 3C:
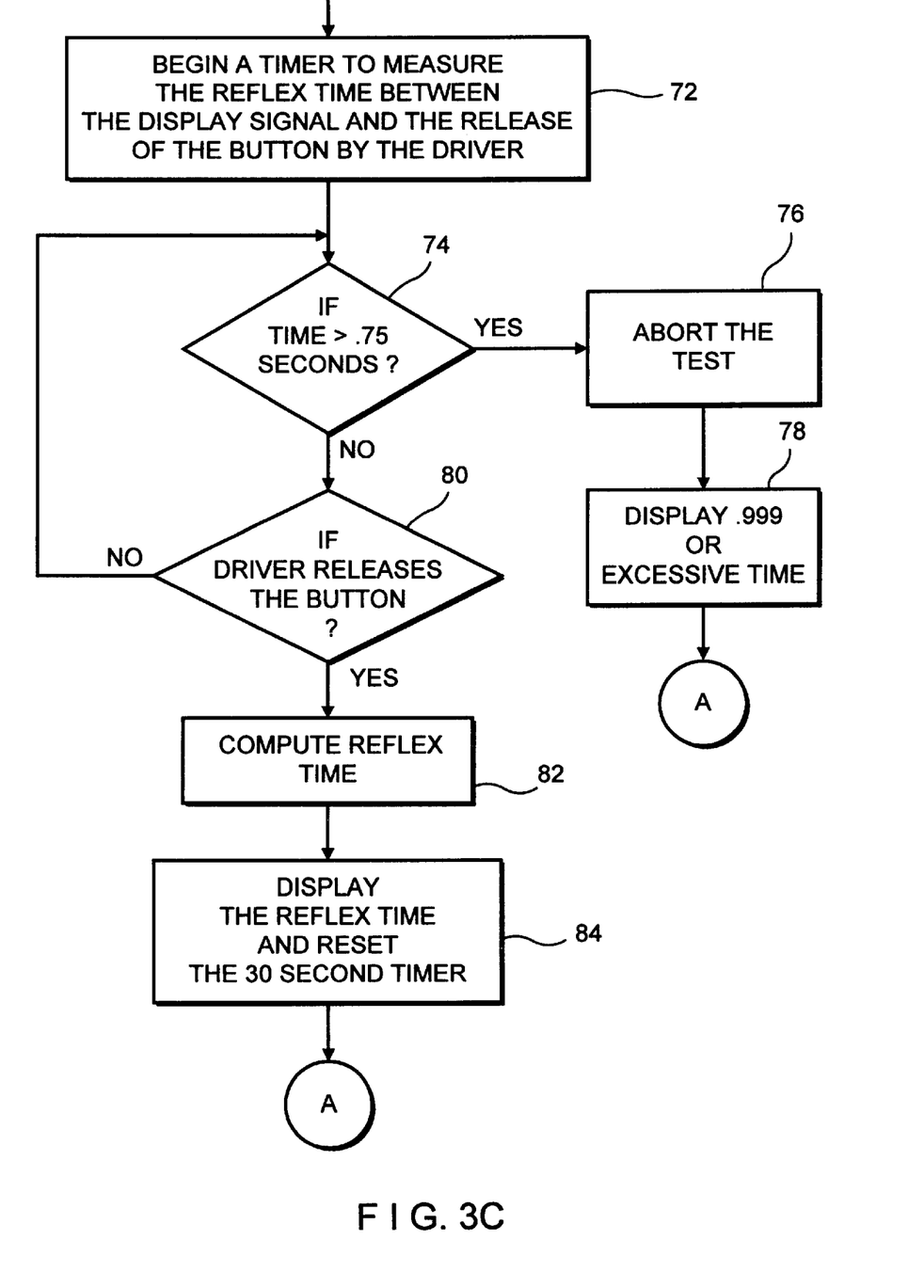

The F function key can also be utilized to run the driver reaction time tester software as set forth in FIGS. 3A–C. The display of the driver's reaction tester is provided directly on display means 14 without the need for any additional equipment, components, or interconnections. To select the driver's reaction tester, the driver would repeatedly press the F function key until everything on the screen turns on at once. This process can also be utilized to check for proper screen operation. Once in driver reaction test mode, if a push button connected to either Push Button 1 terminal 30 or Push Button 2 terminal 32 is pressed and held down, the screen will go blank. After 2 seconds, all eights (or some other distinctive display) will be shown on display means 14, at which time the driver releases the push button being held. Vehicle control box 10 will now calculate the amount of time from when the eights were displayed to when the push button was released and such information will be displayed on display means 14. This is the driver's reaction time. If the driver releases the button too soon, (i.e., before the display turns on), dashes (or some other clearly distinctive display) will be shown on display means 14 to indicate a red light. If the driver does not let go of the button within 0.75 seconds after all eights are displayed on display means 14, display means 14 will show reaction time of all nines (or some other clearly distinctive display) to indicate a missed light. The driver may exit the driver's reaction test mode by pressing any function key C–F on keypad 12. If neither the push button connected to Push Button 1 terminal 30 nor Push Button 2 terminal 32 is pressed, the unit will automatically exit driver's reaction test mode after thirty seconds. However, each time a push button connected either Push Button 1 terminal 30 or Push Button 2 terminal 32 is pressed, the thirty second timer will be set.

The functioning described in conjunction with driver's reaction test mode is further described in the simplified flow chart of FIGS. 3A–C. First, the F function key on vehicle control box 10 is depressed until everything on the screen turns on at once (box 46). Box 48 reflects the starting of a thirty second timer. A decision box 50 determines whether the driver has entered any data on keypad 12. If yes, the driver's reaction test mode is exited (box 51). If the driver does not enter data on keypad 12, a decision box 52 of the software determines whether the thirty second timer box 48 has expired. If the timer has expired, the driver's reaction test mode is exited (box 53). If the thirty second timer has not expired, a decision box 54 determines whether the driver has depressed the push button. If no push button is pressed, the software returns to point A. If the driver indeed had pressed a push button, a reaction test is conducted (box 56).

Once the test is initiated the display will become blank as reflected in box 58. After a pause which has been preferably set at two seconds (box 60), a determination is made as to whether the driver has released the push button which had been depressed (box 62). If the driver had released the push button, the test is aborted (box 64), all dashes are displayed on display means 14 (box 66) and the software returns to point A. The depiction of all dashes on display means 14 would indicate to the driver a red light condition wherein he/she would have been disqualified. If the driver had not yet released the push button, the two second timer would continue to run. When that timer expires, all eights would be indicated on display means 14 (box 70). At this point, a timer to measure the reaction time of the driver between the display signal and the release of the push button by the driver would be activated (box 72). If the driver does not let go of the button within 0.75 seconds after the eights are displayed (box 74), the test would be aborted (box 76), all nines would be displayed on display means 14 (box 78), and the software would return to point A. Alternatively, if the driver releases the button within 0.75 seconds from when all eights are displayed on display means 14 (box 80), the reaction time would be calculated (box 82) and displayed on display means 14 (box 84). The actual reaction time displayed on display means 14 is, in actuality, the difference between when all eights appeared on display means 14 and when the driver released the depressed push button. Repetition of a simulated test will improve a driver's reaction time in actual race conditions.

Figure 4:
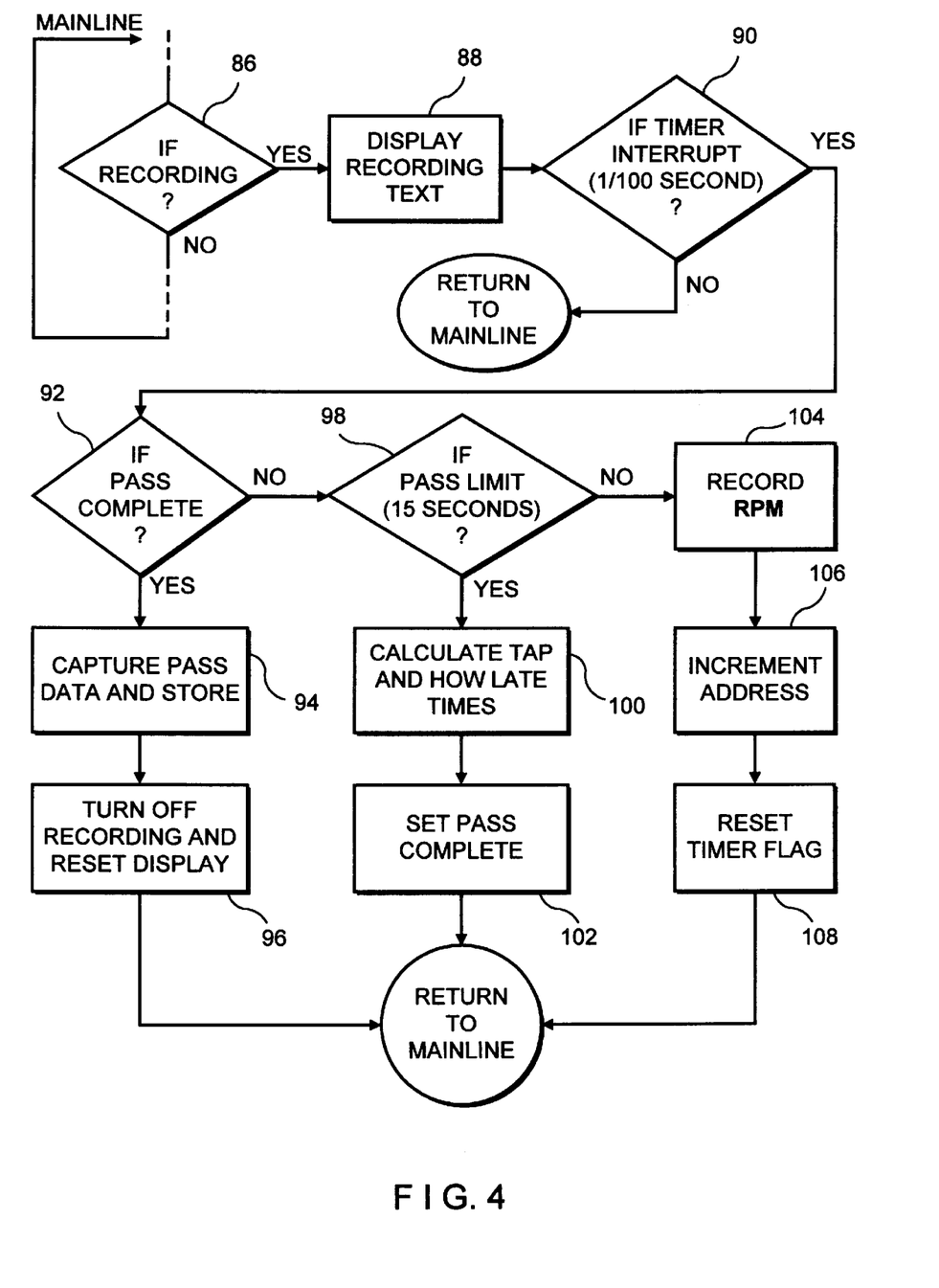
FIG. 4 reflects a simplified flow diagram of the recording portion of a race to permit the race playback feature of the present invention.

The F function key can also be incorporated to incorporate a novel race playback feature on vehicle control box 10 by means of keypad 12. Preferably, the replay tachometer can record the engine RPM every hundredth of a second for fifteen seconds after the transbrake is released. To start the unit recording, the unit must first be armed by pressing and releasing the push button that is connected to the Line Lock push button terminal 36. After the unit is armed, if either a push button that is connected to Push Button 1 terminal 30 or a push button that is connected to Push Button 2 terminal 32 is pressed and released after either the Delay 1 or Delay 2 timer times out and releases the transbrake, the apparatus will start recording RPM information. When vehicle control box 10 is recording, some symbol such as "RECORD" will be shown on display means 14. The recording portion of the playback feature is shown in FIG. 4. If the device is recording RPM information (box 86), the symbol "RECORD" will be shown on display means 14 (box 88). RPM information will be checked every one hundredth of a second (box 90) for a period of fifteen seconds after the transbrake of the vehicle is released.

Next, the software in vehicle control box 10 determines if the pass (or run) is completed (box 92). If so, the pass data is captured and stored (box 94), the recording is ended, and the display on display means 14 is reset (box 96). If the pass is not complete at box 92, a determination is made as to whether the fifteen second limit has been reached (box 98). If so, the Tap and "How Late" times are calculated (box 100) and the pass is defined as "complete" (box 102). If the pass limit of fifteen seconds had not been reached at box 98, the recording of RPM information continues (box 104), the address is incremented (box 106), and the timer flag is reset (box 108).

Figure 5A:
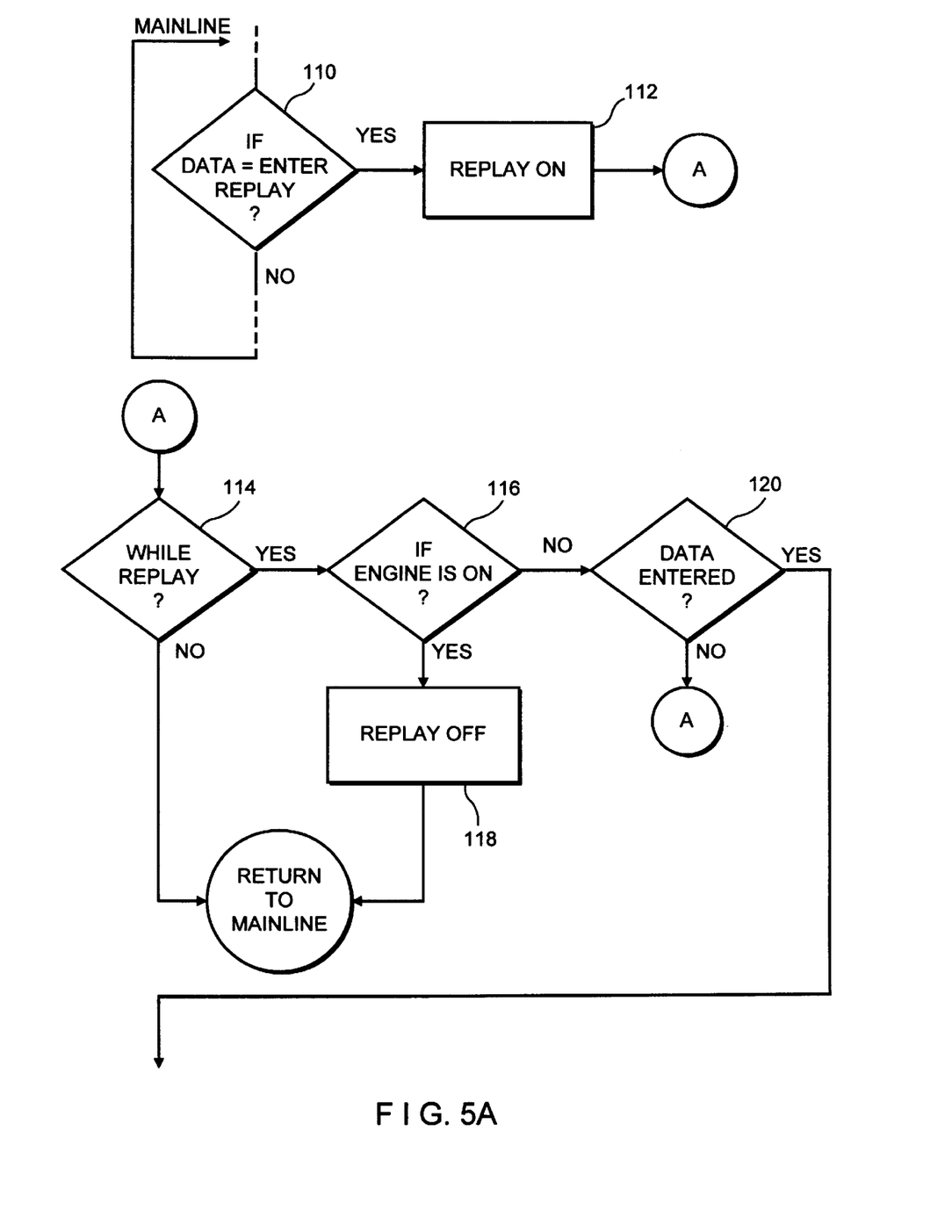
FIG. 5A, FIG. 5B, and FIG. 5C reflect a simplified flow diagram of the replaying portion of the race playback feature of the present invention.
Figure 5B:
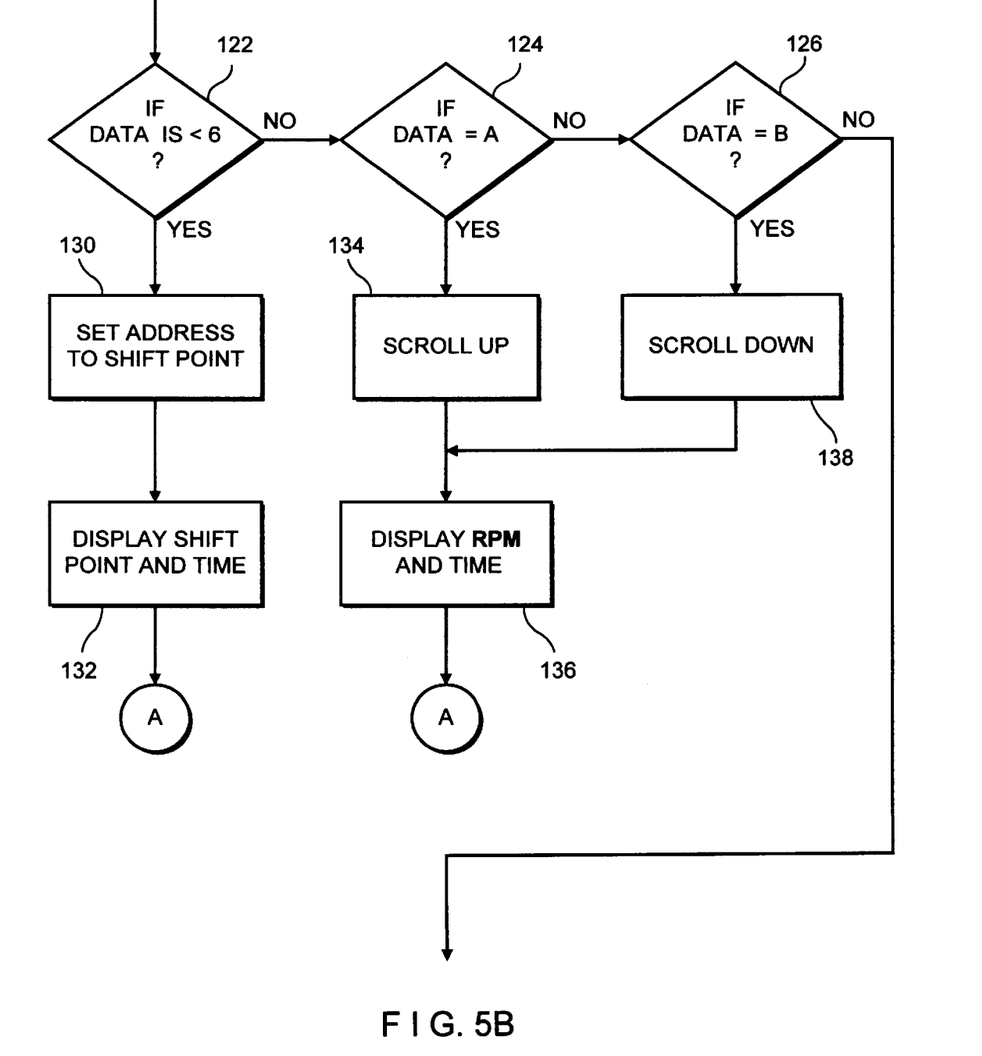
Figure 5C:
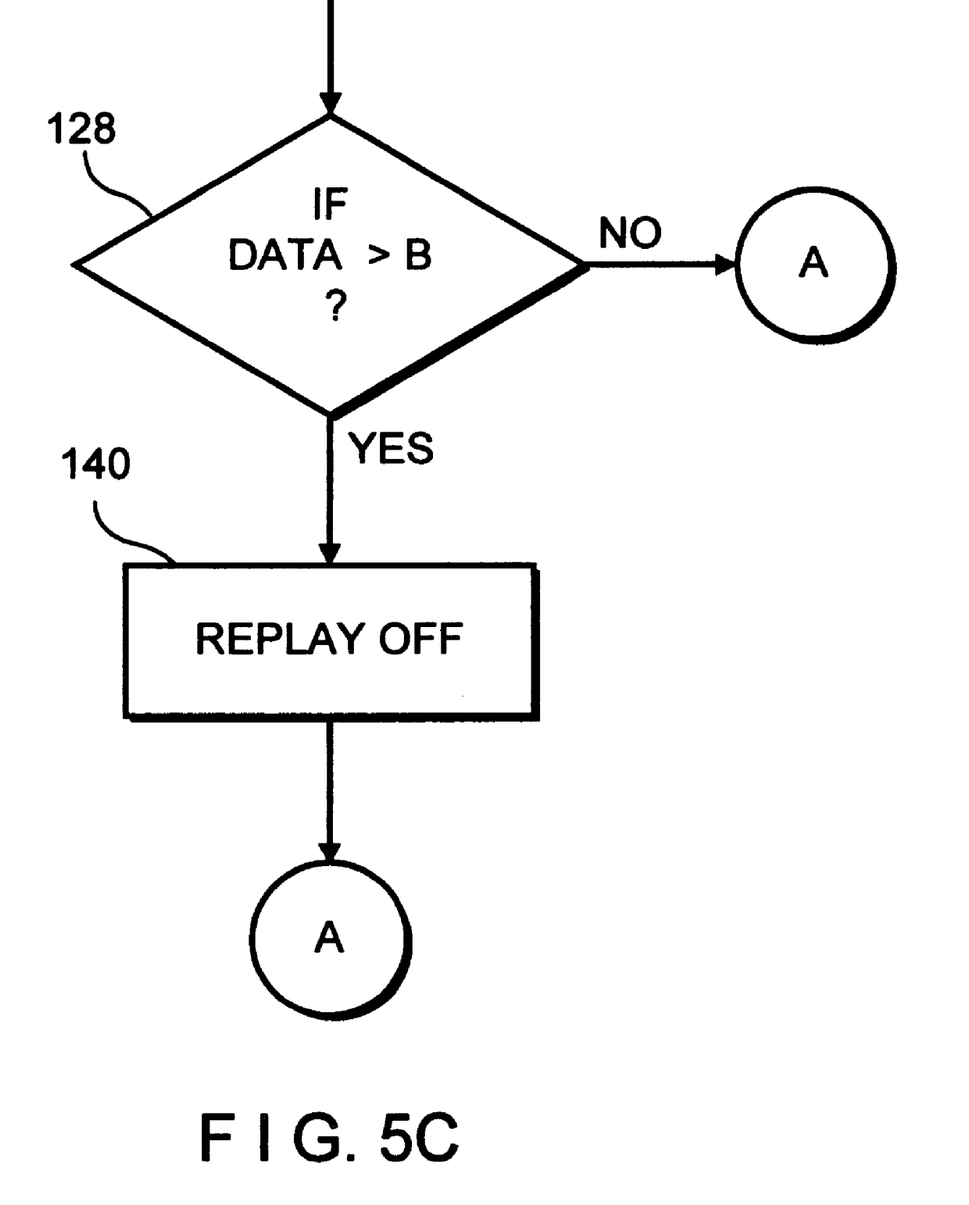

FIGS. 5A–C describe, in simplified flow chart format, the playback of the recorded information. First, the driver will repeatedly press the F function key until the replay function is entered (box 110). At that point, the letters "PLAY" are shown on display means 14 (box 12). Once in playback mode (box 114), a determination is made on whether the engine is on (box 116). If the engine is ON, the replay is shut off (box 118) since, in the preferred embodiment, the replay of a race on display means 14 is only permissible when the engine is OFF. Next, the software looks to see which data is entered by the driver (box 120). The data will be determined to be either the 0–5 keys (box 122), the A function key (box 124), the B function key (box 126), or one of function keys C–F (box 128).

Since, in the preferred embodiment, up to five shifts can be recorded and replayed, if the entered data is a numerical key between 0–5 (box 122), the software will go to the address associated with that particular shift (box 130) and display that shift point and time (box 132) on display means 14.

If the A function key is pressed (box 124), the elapsed time from the release of the transbrake will scroll up (box 134) and RPM information and time will be displayed on display means 14 (box 136). Alternatively, if the B function key is pressed (box 126) the time measured from the release of the transbrake will scroll down (box 138) but RPM and time information will again be displayed on display means 14 (box 136). Finally, if function keys C–F are pressed (box 128), the replay function is shut off (box 140).

It will be apparent from the foregoing description that the present invention provides a new and improved on-board vehicle control box which utilizes a single on-board display means for providing numerous user-selectable functions including delay box functions, throttle stop controller functions, driver time reaction testing, and recording and playback of race results. While a specific layout of alphanumeric and function keys has been provided, countless variations may be utilized. Additionally, further variations are possible. For instance, a voice enunciator could be implemented to guide the driver through use of the present invention.

While there has been shown and described what is presently considered to be the preferred embodiment of this invention, it will be obvious to those skilled in the art that various changes and modifications may be made without departing from the broader aspects of this invention. For instance, although a single keypad has been provided, a multiple keypad arrangement is also possible. Furthermore, the provided display means may provide alphanumeric information or graphical information. Additionally, various types of connectors could be incorporated.

It is, therefore, aimed in the appended claims to cover all such changes and modifications as fall within the true scope and spirit of the invention.

We claim:

1. A multi-function, composite apparatus for mounting on a drag racing vehicle comprising:

a terminal panel having at least one lead for coupling said apparatus to a vehicle control component of said vehicle;

a visual display means to depict a plurality of differing indicia selectable by a user wherein at least one of said indicia is reflective of vehicle performance during actual racing and a second of said indicia relates to a driver reaction time tester; and a keypad having a plurality of user-operable keys including function keys for determining which of said plurality of different indicia is shown on said display means and data input keys to modify data of said apparatus, said user-operable keys further utilized to initiate said driver reaction time tester.

2. The apparatus of claim 1 wherein said indicia relating to vehicle performance during actual racing is a delay box timer.

3. The apparatus of claim 1 wherein said indicia relating to vehicle performance during actual racing is a cross over delay timer.

4. The apparatus of claim 1 wherein said indicia relating to vehicle performance during racing is a throttle stop controller timer.

5. The apparatus of claim 1 further comprising a third of said indicia that can be depicted on said visual display means which relates to a race playback function.

6. The apparatus of claim 5 wherein said race playback function is based on RPM information.

7. The apparatus of claim 5 wherein said is based on time.

8. The apparatus of claim 1 wherein said visual display means is a liquid crystal display.

9. The apparatus of claim 1 wherein said vehicle control component is a transbrake.

10. The apparatus of claim 1 wherein said vehicle control component is a throttle stop controller.

11. The apparatus of claim 1 wherein said vehicle control component is a tachometer.

* * * * *